(12) United States Patent
Bogenrieder et al.

(10) Patent No.: US 8,882,137 B2
(45) Date of Patent: Nov. 11, 2014

(54) AIRBAG, IN PARTICULAR FOR A MOTOR VEHICLE

(75) Inventors: Ralf Bogenrieder, Stuttgart (DE);
Christian Burczyk, Stuttgart (DE);
Andreas Hirth, Dielheim (DE);
Friedrich Reiter, Sindelfingen (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 13/821,065

(22) PCT Filed: Sep. 3, 2011

(86) PCT No.: PCT/EP2011/004446
§ 371 (c)(1),
(2), (4) Date: Apr. 9, 2013

(87) PCT Pub. No.: WO2012/031725
PCT Pub. Date: Mar. 15, 2012

(65) Prior Publication Data
US 2013/0187366 A1    Jul. 25, 2013

(30) Foreign Application Priority Data
Sep. 7, 2010   (DE) .......................... 10 2010 044 527

(51) Int. Cl.
*B60R 21/231*    (2011.01)
*B60R 21/235*    (2006.01)

(52) U.S. Cl.
CPC ............. *B60R 21/231* (2013.01); *B60R 21/235* (2013.01); *B60R 2021/23115* (2013.01)
USPC ........................... 280/729; 280/742; 280/738

(58) Field of Classification Search
CPC ........................... B60R 21/231; B60R 21/233
USPC ........................... 280/738, 729, 742
See application file for complete search history.

(56) References Cited

U.S. PATENT DOCUMENTS

| | | | |
|---|---|---|---|
| 3,675,942 A * | 7/1972 | Huber | 280/738 |
| 3,742,658 A * | 7/1973 | Meyer | 52/2.21 |
| 3,776,570 A * | 12/1973 | Weman | 280/738 |
| 3,883,154 A * | 5/1975 | McCullough et al. | 280/735 |
| 3,887,213 A * | 6/1975 | Goetz | 280/738 |
| 3,907,327 A * | 9/1975 | Pech | 280/729 |
| 3,929,350 A * | 12/1975 | Pech | 280/729 |
| 3,960,386 A * | 6/1976 | Wallsten | 280/731 |

(Continued)

FOREIGN PATENT DOCUMENTS

| | | | |
|---|---|---|---|
| DE | 10 2007 052 246 A1 | | 5/2009 |
| DE | 10 2008 057 376 A1 | | 5/2010 |
| DE | 102010045693 A1 * | | 5/2011 |

OTHER PUBLICATIONS

International Search Report with English translation dated Dec. 19, 2011 (four (4) pages).

(Continued)

*Primary Examiner* — Nicole Verley
(74) *Attorney, Agent, or Firm* — Crowell & Moring LLP

(57) ABSTRACT

An airbag for a motor vehicle includes a support structure moveable from a stowage position into a restraint position and a covering that surrounds a restraint volume of the airbag formed by the support structure in its restraint position. The covering is an element that is separate from the support structure and joined to the support structure.

3 Claims, 3 Drawing Sheets

(56) References Cited

U.S. PATENT DOCUMENTS

Figure 1:
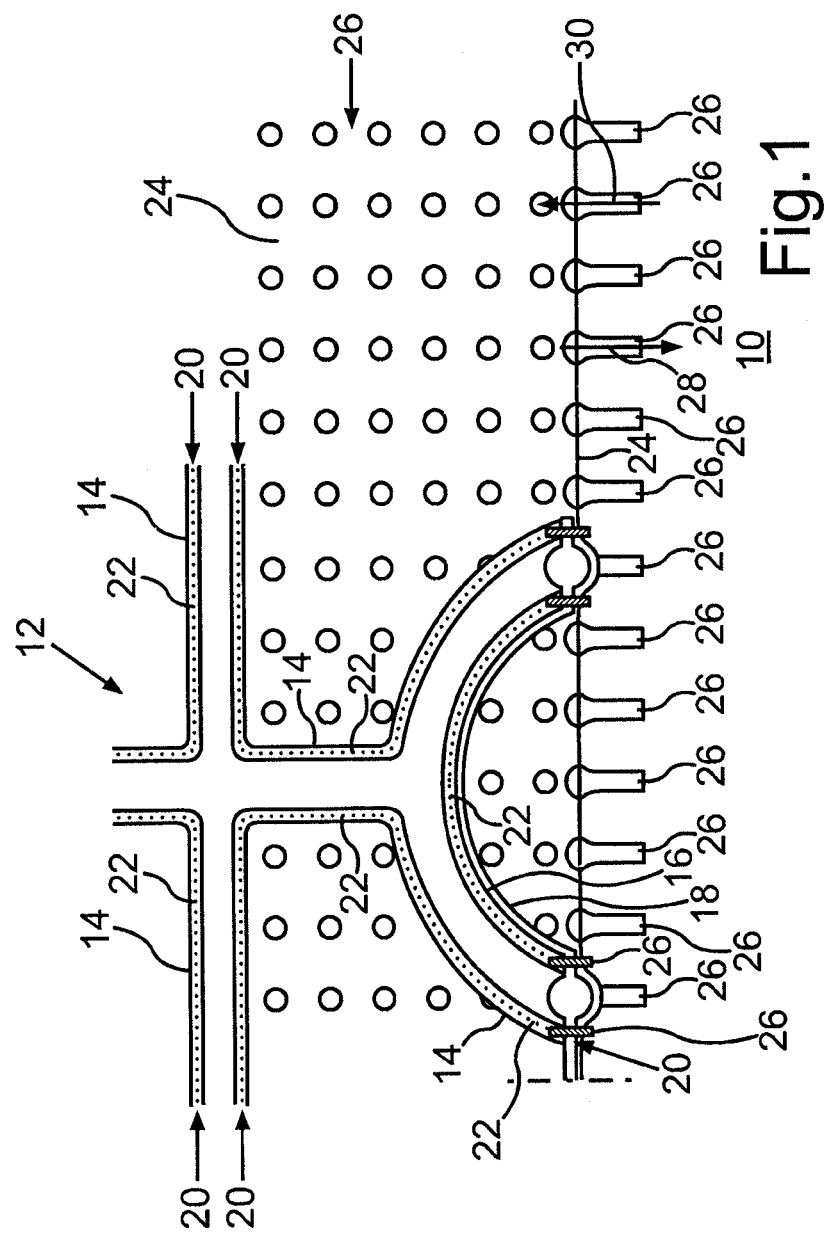

| | | | |
|---|---|---|---|
| 3,970,328 A * | 7/1976 | Wallsten | 280/731 |
| 4,076,277 A * | 2/1978 | Kuwakado et al. | 280/738 |
| 4,317,315 A * | 3/1982 | LeBlang | 52/2.21 |
| 5,193,847 A * | 3/1993 | Nakayama | 280/738 |
| 5,372,381 A * | 12/1994 | Herridge | 280/743.1 |
| 5,492,363 A * | 2/1996 | Hartmeyer et al. | 280/739 |
| 5,901,979 A * | 5/1999 | Schneider et al. | 280/738 |
| 6,260,877 B1 * | 7/2001 | Rasmussen, Sr. | 280/729 |
| 6,702,320 B1 * | 3/2004 | Lang et al. | 280/729 |
| 7,025,376 B2 * | 4/2006 | Dominissini | 280/729 |
| 7,448,644 B2 * | 11/2008 | Zhong et al. | 280/729 |
| 8,240,705 B2 * | 8/2012 | Ishida | 280/729 |
| 8,342,572 B2 * | 1/2013 | Hirth et al. | 280/743.1 |
| 8,403,362 B2 * | 3/2013 | Baumann et al. | 280/739 |
| 8,505,965 B2 * | 8/2013 | Hirth et al. | 280/730.1 |
| 8,511,710 B2 * | 8/2013 | Fukawatase | 280/743.1 |
| 8,651,522 B2 * | 2/2014 | Hirth et al. | 280/743.1 |
| 2006/0197320 A1 * | 9/2006 | Abe | 280/729 |
| 2011/0049846 A1 | 3/2011 | Hirth et al. | |
| 2011/0248487 A1 * | 10/2011 | Burczyk et al. | 280/742 |

OTHER PUBLICATIONS

German-language Written Opinion (PCT/ISA/237) (seven (7) pages).

* cited by examiner

AIRBAG, IN PARTICULAR FOR A MOTOR VEHICLE

BACKGROUND AND SUMMARY OF THE INVENTION

Exemplary embodiments of the present invention relate to an airbag, in particular for a motor vehicle.

German Patent Document No. DE 10 2007 052 246 A1 discloses an airbag with a support structure which can be moved from a stowage position into a restraint position. The airbag further comprises a covering by means of which a restraint volume of the airbag formed by the support structure in its restraint position is surrounded.

Exemplary embodiments of the present invention are directed to an airbag that involves reduced costs. Such an airbag, in particular for a motor vehicle, comprises a support structure that can be moved from a stowage position into a restraint position and a covering by means of which a restraint volume of the airbag formed by the support structure in its restraint position is surrounded. In accordance with the present invention the covering is designed as an element that is separate from the support structure and joined to the support structure. In other words, the support structure and the covering are not integrated to form a single part, but rather designed as different elements or components and joined to each other.

In this way, it is possible to produce within production processes running at least substantially parallel to one another the support structure and the covering and to join the covering to the support structure after the support structure and the covering have been produced. This represents a particularly uncomplicated and therefore time-saving and cost-effective production process for the airbag. This is due to the fact that the covering and the support structure are not designed as a single part and therefore do not have to be made of one and the same layer or layers, which would involve a complex and therefore cost-intensive production process.

In the production process of the airbag according to the invention, the covering acts as a carrier element, in particular as a carrier layer, to which the support structure is secured and which surrounds the restraint volume in the restraint position.

As well a reducing production time, the number of production steps and production costs, the invention offers the further advantage that a pack volume of the airbag according to the invention is small. This means that the support structure in its stowage position, in which it is folded, rolled up or the like, is reduced in size compared to the restraint position and joined to the covering, occupies a very small volume, so that the airbag as a whole requires very little space. The airbag according to the invention further has a very low weight, which favors its movement into the restraint position and contributes to a low overall weight of the motor vehicle.

The covering can be produced as cheap bulk material and, for example, transported on rolls from which the material is unwound in the production of the airbag and joined to the support structure by bonding and/or sewing, for example. In the restraint position, the restraint volume is then surrounded by the covering, at least to a large extent. There is further no need for complex and therefore time-consuming and cost-intensive geometry matching between the covering and the support structure and further functional surfaces, which keeps the costs of the airbag according to the invention low.

In an advantageous embodiment of the invention, the support structure is surrounded by the covering, the covering being located on the outside of the support structure with respect to the restraint volume and joined thereto. This keeps manufacturing complexity and therefore costs low. It is also possible to have the covering surrounded by the support structure, so that the covering is located on the inside of the support structure with respect to the restraint volume. This, too, allows for a simple and cost-effective production of the airbag according to the invention.

In an advantageous embodiment of the invention, the support structure comprises a plurality of structural elements, in particular volume elements that are variable in their volumes, in particular tubes, which are represented by two layers, in particular textile layers, which are joined to each other in some regions. The layers cover each other and are joined to each other in joint regions, for example by bonding and/or sewing, while not being joined in the intermediate regions, enabling the layers to lift off each other in the intermediate regions. A medium, in particular a gas such as air, can flow into these intermediate regions of the layers to increase the volume of the structural elements, in particular to inflate them and to move the support structure into the restraint position. In this context, one of the layers of the support structure can be surrounded by the covering and the covering is surrounded by the other layer of the support structure. In other words, the covering is joined to one of the layers of the support structure on one side and to the other layer of the support structure on the opposite side. In this embodiment, in particular, the covering acts as carrier material for the support structure, resulting in a particularly cost-effective production process for the airbag according to the invention.

It is also advantageous if at least some regions of the covering are permeable to air, so that an inflation of the structural elements, for example, does not affect it negatively, but rather allows a fast inflation of the structural elements with air and therefore a fast movement of the support structure from the stowage position into the restraint position.

It is further advantageous if at least some regions of the covering are permeable to air and allow air, in particular ambient air, to flow into the restraint volume, so that the restraint volume can be filled with air in a quasi-passive manner by inflating only the support structure or its structural elements into the restraint position, for example by actively applying gas pressure. This enables air to flow into the restraint volume in a particularly simple way and particularly fast, so that the airbag according to the invention can occupy a very large volume in the interior of the motor vehicle and is therefore able to restrain occupants in an accident and protect them against severe injury.

In order to allow a fast air flow into the restraint volume while the support structure moves from the stowage position into the restraint position, the air flowing into the restraint volume in one direction of flow, and in order to prevent a discharge of the air from the restraint volume in a direction opposed to this direction of flow, at least some regions of the covering are designed as valve devices that allow the air flow into the restraint volume in the first direction of flow while at least substantially preventing a discharge of the air from the restraint volume in the opposite direction of flow. This at least substantially prevents a displacement of air out of the restraint volume if an occupant hits the support structure and the covering, thereby plunging into the airbag.

Due to the fact that the support structure and the covering are designed as separate components that are joined to each other, there is no need for complex geometry matching between the covering and the support structure, because the covering can be produced as bulk material and regions of the covering where the covering is designed as a valve device and where the covering provides the valve function are evenly distributed across the covering, so that the covering can be placed in any position relative to the support structure and joined thereto in any position, so that the valve function relevant to the entry and discharge of the air into and from the restraint volume operates irrespective of the position of the covering relative to the support structure and a reliable and excellent functionality of the airbag is ensured.

The covering is advantageously designed in one piece, for example as a one-piece continuous and two-dimensional element, in particular a textile element. The covering may, however, be designed in two layers and comprise a first air-permeable layer, in particular a textile layer, and a second layer, in particular a film, which covers at least some regions of the first layer and is joined thereto in some regions, some regions of the second layer being impermeable to air and some regions being permeable to air entering the restraint volume in the first direction of flow and impermeable to air in the second direction of flow opposed to the first direction of flow. If the second layer is designed as a film, for example, this is made of a plastic material that is initially impermeable to air. To provide the valve function of the covering, the film is, for example, provided with valve tubes formed from the film in a thermoforming process. These valve tubes allow the air to flow into the restraint volume in the first direction of flow, as the valve tubes form air passages having an inlet port on the one hand and an outlet port terminating into the restraint volume on the other hand.

If an occupant hits the airbag and thus the support structure and the covering, the internal pressure in the restraint volume increases, which would result in a discharge of the air from the restraint volume. This discharge is now prevented by providing that the valve tubes, due to the increase of the internal pressure and the resulting movement of air in the second direction of flow, collapse, are compressed or in a similar way at least substantially block the outlet and inlet ports and the air passages, so that only very little, if any, air can flow out of the restraint volume. This results in a very long dwell time of the airbag, and the occupants can be caught safely and protected.

At this point, it should be noted that the valve function of the covering as described above can also be obtained in another way. In any respect, the design of the support structure and the covering as separate elements or components that are joined to each other allows for a simple, time-saving and cost-effective production of the airbag.

Further advantages, features and details of the invention can be derived from the following description of preferred embodiments and from the drawing. The features and feature combinations mentioned in the above description and the features and feature combinations mentioned below in the description of the figures and/or shown in the figures only can be used not only in the specified combination but also in other combinations or individually without leaving the scope of the invention.

BRIEF DESCRIPTION OF THE DRAWING FIGURES

Figure 2:
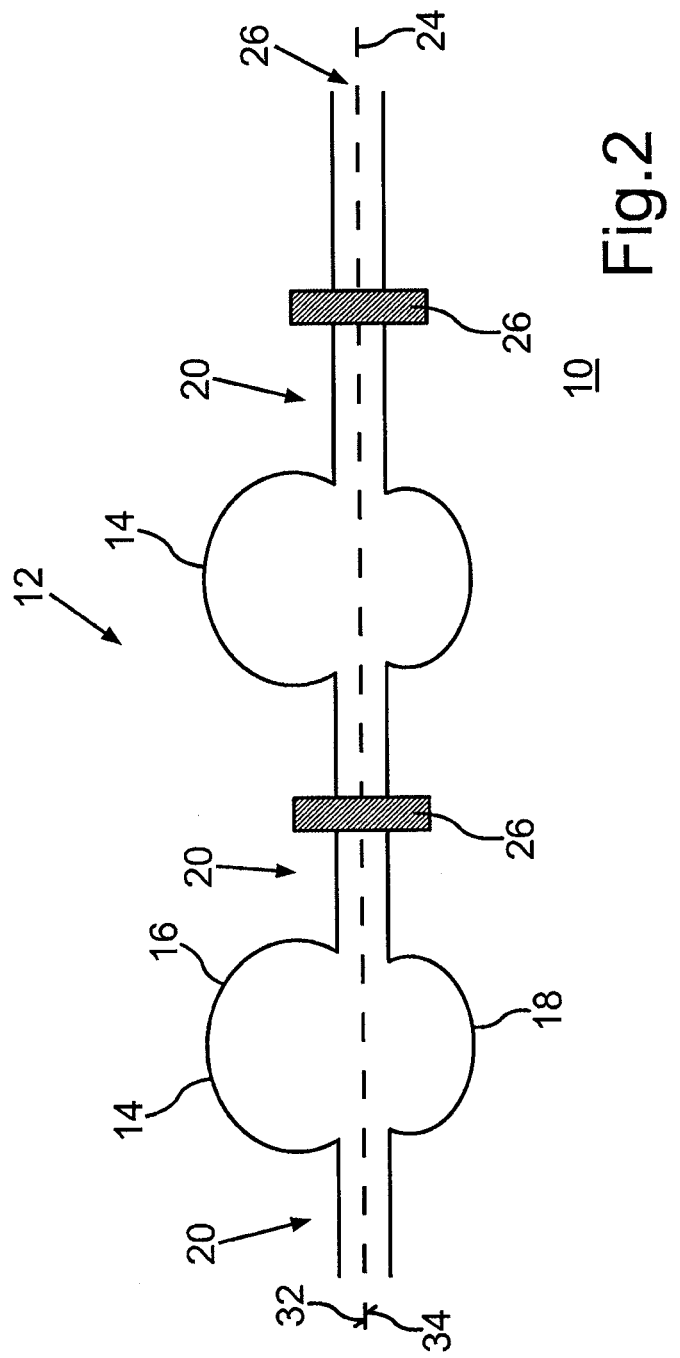
Figure 3:
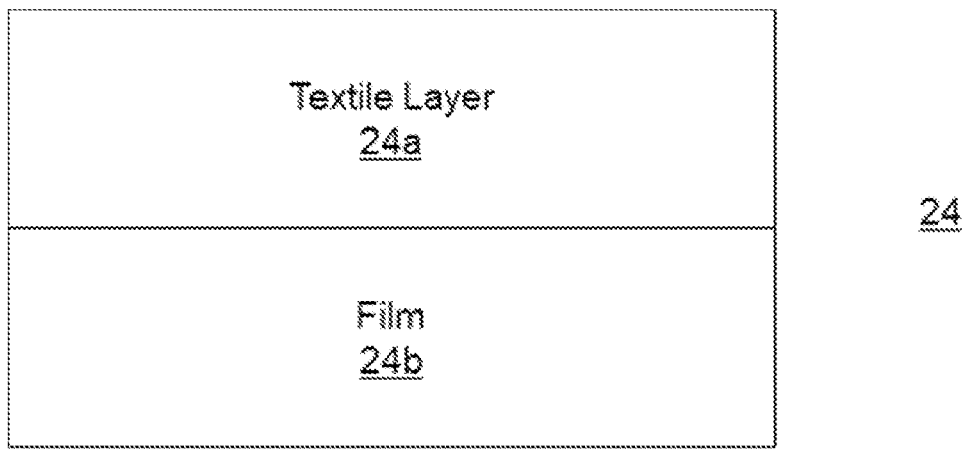

Of the drawing:

FIG. 1 is part of a diagrammatic sectional view of an airbag having a support structure comprising a plurality of inflatable tubes and being inflatable from a stowage position into a restraint position, and further having a covering by which a restraint volume of the airbag formed by the support structure in its restraint position is surrounded, the covering and the support structure being designed as elements which are separate from each other and joined to each other, FIG. 2 is part of a diagrammatic sectional view of a further embodiment of the airbag according to FIG. 1, and FIG. 3 is a highly schematic illustration of a covering comprising an air-permeable textile layer and a second film layer.

DETAILED DESCRIPTION

FIG. 1 shows an airbag 10, in particular for a car, which comprises a support structure 12. The support structure 12 comprises a plurality of tubular elements 14, which are at least partially in fluid connection with one another and which can be increased in volume by being inflated by means of the application of a gas in the form of air.

The tubular elements 14 are formed from a first textile layer 16 and a second textile layer 18, the textile layers 16 and 18 being superimposed on each other. The textile layers 16 and 18 are joined to each other in edge regions 20, for example by sewing as illustrated by seams 22 in FIG. 1. In intermediate regions between the seams 22, the textile layers 16 and 18 are not joined together and can lift off each other. As a result, air can actively be blown into the intermediate regions between the edge regions 20 and the seams 22, for example by means of a gas generator, so that the support structure 12 is unfolded from a stowage position, in which it is stored in a housing in a rolled-up and folded state or the like, into a restraint position, in which it moves out of the housing and can catch and restrain one or more occupants for protection against serious injury. In the restraint position, the support structure 12 forms a restraint volume of the airbag 10, which is particularly large. The restraint volume is much larger than a total volume that is provided by the fluid-connected individual volumes of the fluid-connected tubular elements 14 and that has to be inflated actively by applying gas (inflation of the tubular elements 14). As a result, the support structure 12 or the airbag 10 respectively can unfold very fast while providing a very large restraint volume. In addition, the support structure 12 or the airbag 10 respectively can be moved into the restraint position for the occupant(s) in a particularly gentle way.

The airbag 10 further comprises a covering 24 by which the restraint volume formed by the support structure 12 is surrounded. The covering 24 is designed as an element that is separate from the support structure 12 and joined to the support structure 12 by sewing the support structure 12 to the covering as illustrated by seams 26 in FIG. 1.

As FIG. 1 shows, the covering 24 is in the restraint position surrounded by the support structure 12, which, due to its truss-like design, is also referred to as a truss structure, wherein the covering 24 is in the restraint position of the support structure 12 located on a side of the support structure 12 facing the restraint volume and joined to this side. Alternatively, the covering 24 can be located on a side of the support structure 12 that is remote from the restraint volume and joined to that side.

As FIG. 1 further shows, the covering 24 comprises a plurality of valves 26, only a representative number of valves 26 being identified by a reference number.

The covering 24 is, for example, at least partially represented by a plastic film, the valves 26 being produced by a thermoforming process in the plastic film, so that the valves 26 are present in the form of tube valves.

These tube valves, for example, let ambient air from the environment flow into the restraint volume in a first direction of flow indicated by a directional arrow 28. Via respective inlet ports, the air enters air passages formed by the tube valves and flows from the air passages via outlet ports terminating into the restraint volume into the restraint volume.

In contrast, the valves 26 designed as tube valves at least substantially prevent a flow of air from the restraint volume in a second direction of flow indicated by a directional arrow 30, so that the airbag has a very good dwell time and is capable of restraining the occupant(s) advantageously.

As illustrated in FIG. 3, the covering 24 can comprise, for example, an air-permeable, e.g. mesh-like, textile layer 24a as well as the film 24b described above, which is impermeable to air in some regions and permeable to air in the first direction of flow in some regions and impermeable to air in the second direction of flow, the textile layer 24a and the film 24b providing a valve device having a valve function. The textile layer 24a acts as a penetration protector, so that the described tube valves of the film 24b do not undesirably penetrate in the second direction of flow, in which the air could be discharged from the restraint volume, thus allowing an undesirable discharge of air from the restraint volume.

FIG. 1 shows that the covering 24 acts as a carrier material and can be produced and supplied as inexpensive bulk material in the production of the airbag 10. As the valves 26 are evenly distributed across the covering 24, there is no need for a time-consuming and cost-intensive defined positioning of the covering 24 relative to the support structure 12. On the contrary, the covering 24 can be placed in any position relative to the support structure 12 and joined, in particular sewn, thereto, so that the valve function described above and therefore the advantageous function of the airbag 10 are ensured.

FIG. 2 shows a further embodiment of the airbag 10. As FIG. 2 shows, the covering 24 is now arranged between the first and second textile layers 16 and 18 forming the tubular elements 14. In other words, the textile layer 16 is located on one side 32 of the covering 24 and joined thereto, while the textile layer 18 is located on the opposite side 34 of the covering 24 and joined thereto.

As illustrated in FIG. 2, the valves 26 are arranged both between the tubular elements 14 and the edge regions 20 and between the edge regions 20 within the respective tubular elements 14, thereby allowing both a very fast and efficient flow or air into the restraint volume and a fast and efficient inflation of the tubular elements 14 and correspondingly a fast movement of the support structure 12 from the stowage position into the restraint position.

In the embodiment of the airbag 10 according to FIG. 2, the covering 24 can likewise be produced as inexpensive bulk material. In addition, there is likewise no need for a time-consuming and cost-intensive alignment of the covering 24 relative to the support structure 12 in order to obtain the valve function described above. The airbag 10 according to FIG. 2 can also be produced very cheaply, because the covering 24 is designed as an element which is separate from the support structure 12 and joined, in particular sewn, thereto.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. An airbag for a motor vehicle, comprising:
   a support structure configured to be moveable from a stowage position into a restraint position; and
   a covering configured to surround a restraint volume of the airbag formed by the support structure in its restraint position,
   wherein the covering is an element that is separate from the support structure and joined to the support structure,
   wherein the support structure comprises a plurality of structural elements having variable volumes and having two textile layers, which are joined to each other in some regions, and
   wherein the covering passes between the two textile layers of the support structure.

2. The airbag according to claim 1, wherein the restraint volume is at least predominantly surrounded by the covering.

3. The airbag according to claim 1, wherein the covering comprises a first air-permeable textile layer and at least one second film layer, the at least one second film layer covers at least some regions of the first layer and is joined thereto in some regions, some regions of the second film layer being impermeable to air and some regions being permeable to air entering the restraint volume in a first direction of flow and impermeable to air in a second direction of flow opposed to the first direction of flow.

\* \* \* \* \*